United States Patent
Heggen

(10) Patent No.: US 9,345,986 B2
(45) Date of Patent: May 24, 2016

(54) METHOD FOR EVAPORATION AND POSSIBLE DISTILLATION OF FLUIDS USING A HEAT PUMP

(76) Inventors: Ola Heggen, Drammen (NO); Lars Harald Heggen, legal representative, Drammen (NO)

( * ) Notice: Subject to any disclaimer, the term of this patent is extended or adjusted under 35 U.S.C. 154(b) by 378 days.

(21) Appl. No.: 13/057,036

(22) PCT Filed: Aug. 31, 2009

(86) PCT No.: PCT/NO2009/000305
§ 371 (c)(1),
(2), (4) Date: Feb. 1, 2011

(87) PCT Pub. No.: WO2010/027268
PCT Pub. Date: Mar. 11, 2010

(65) Prior Publication Data
US 2011/0132740 A1   Jun. 9, 2011

(30) Foreign Application Priority Data

Sep. 2, 2008   (NO) .................................... 20083783

(51) Int. Cl.
*B01D 1/28*   (2006.01)
*B01D 3/10*   (2006.01)
(Continued)

(52) U.S. Cl.
CPC ................ B01D 1/2846 (2013.01); B01D 3/10 (2013.01); B01D 5/006 (2013.01); B01D 5/0036 (2013.01);
(Continued)

(58) Field of Classification Search
CPC ...... B01D 1/00; B01D 1/2846; B01D 1/0082; B01D 5/0036; B01D 5/0039; B01D 5/006; B01D 3/007; B01D 3/10; B01D 3/143; B01D 3/148; B01D 3/20; B01D 3/42; Y02B 30/123; Y10S 62/02; Y10S 203/04; Y10S 203/08; F25B 29/003; F25B 30/02; F25B 30/06; F25B 2700/197; F24D 2200/12; F24D 2200/243
See application file for complete search history.

(56) References Cited

U.S. PATENT DOCUMENTS 1,874,620 A    8/1932   Radford
RE19,700 E *   9/1935   Williams ...................... 248/237
(Continued)

FOREIGN PATENT DOCUMENTS

DE    3227958 A1    3/1983
DE    19723566 C1   3/1999
(Continued)

OTHER PUBLICATIONS

International Preliminary Report on Patentability dated Mar. 8, 2011 for PCT Application No. PCT/NO2009/003050.
(Continued)

*Primary Examiner* — Renee E Robinson
*Assistant Examiner* — Jonathan Miller

(57) ABSTRACT

A method for evaporation and possibly distillation of liquids by means of a heat pump is provided. By using a heat pump (2), energy is taken from energy reservoir(s) (1) such as rivers, sea water, air, or ground heat. However, it is difficult to obtain temperatures high enough to evaporate water at atmospheric conditions. According to the invention, low temperature heat is utilized by means of a heat pump by using the condenser of the heat pump to evaporate liquids in an evaporator (4') at a pressure lower than atmospheric pressure, and thus at a lower evaporation temperature. Furthermore, the saturation of the evaporated liquids is eliminated before the evaporated liquids enter the compressor (10) by the further heating of the evaporated liquids leaving the liquids evaporator (4') in a heat exchanger (11) that utilizes the peak temperature of the refrigerant that leaves the heat pump's refrigerant compressor (3).

10 Claims, 2 Drawing Sheets

Figure 1:
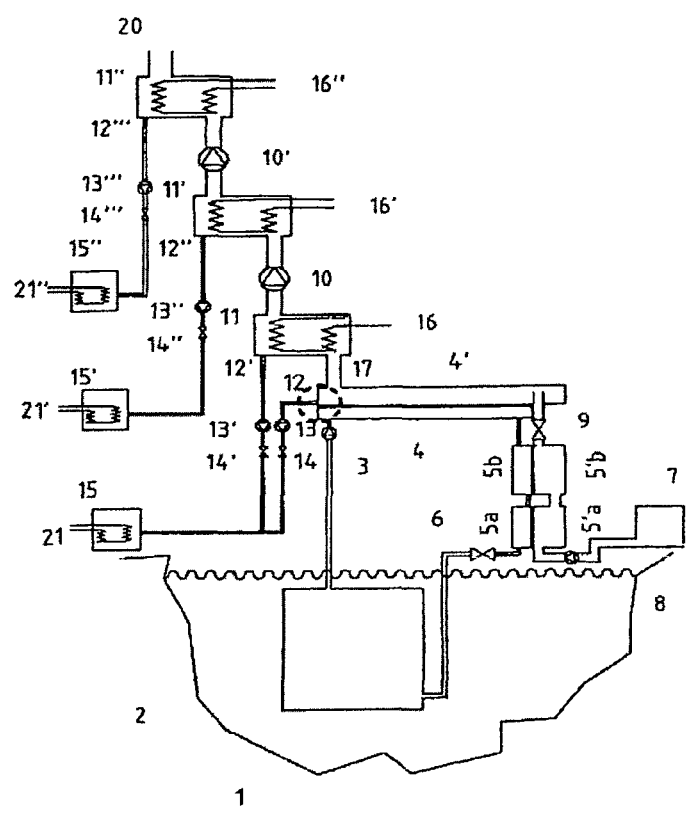

(51) Int. Cl.
*F25B 29/00* (2006.01)
*F25B 30/02* (2006.01)
*B01D 5/00* (2006.01)

(52) U.S. Cl.
CPC ............ *B01D 5/0039* (2013.01); *F25B 29/003* (2013.01); *F25B 30/02* (2013.01); *F24D 2200/123* (2013.01); *Y02B 30/52* (2013.01); *Y10S 203/04* (2013.01)

(56) References Cited

U.S. PATENT DOCUMENTS

| | | | | |
|---|---|---|---|---|
| 2,098,462 | A * | 11/1937 | Miller | 237/9 R |
| 2,802,114 | A * | 8/1957 | Artsay | 290/2 |
| 3,769,808 | A * | 11/1973 | Kramer | 62/115 |
| 4,181,577 | A | 1/1980 | Foley | |
| 4,267,022 | A * | 5/1981 | Pitcher | 203/11 |
| 4,345,971 | A * | 8/1982 | Watson | 202/177 |
| 4,537,660 | A * | 8/1985 | McCord | 202/170 |
| 4,565,161 | A * | 1/1986 | Choquette | 122/32 |
| 4,770,748 | A | 9/1988 | Cellini et al. | |
| 5,088,291 | A * | 2/1992 | Squires | 62/77 |
| 5,108,475 | A | 4/1992 | Briggs | |
| 5,227,027 | A * | 7/1993 | Topper | 203/10 |
| 5,439,560 | A | 8/1995 | Kurematsu et al. | |
| 5,987,770 | A * | 11/1999 | Hino | 34/92 |
| 2003/0037553 | A1* | 2/2003 | Sulc et al. | 62/151 |
| 2004/0007451 | A1 | 1/2004 | Northrup | |
| 2007/0000267 | A1* | 1/2007 | Shibata et al. | 62/238.6 |
| 2008/0190110 | A1* | 8/2008 | Chino et al. | 60/670 |
| 2010/0147965 | A1* | 6/2010 | Sedlak et al. | 237/13 |

FOREIGN PATENT DOCUMENTS

| | | |
|---|---|---|
| WO | 8302445 A | 7/1983 |
| WO | 02081298 A1 | 10/2002 |

OTHER PUBLICATIONS

International Search Report on Patentability dated Dec. 1, 2009 for PCT Application No. PCT/NO2009/00305.
Examination Report dated Jun. 26, 2012 for corresponding AU Application No. 2009288953.
Response to Examination Report dated Jun. 26, 2012 for corresponding AU Patent Application No. 2009288953.
Examination Report dated Oct. 19, 2012 for corresponding AU Application No. 2009288953.
Response to Examination Report dated Oct. 19, 2012 for corresponding AU Application No. 2009288953.
Extended European Search Report dated Aug. 7, 2012 for corresponding EP Application No. 09811751.8.
Supplementary European Search Report dated Aug. 24, 2012 and response as filed for corresponding EP Application No. 09811751.8.
Article 94(3) EPC dated Feb. 18, 2014 and response as filed for corresponding EP Application No. 09811751.8.
Examination Report dated Mar. 12, 2012 for corresponding NZ Application No. 592018.
Examination Report dated Oct. 11, 2012 for corresponding NZ Application No. 592018.
International Preliminary Report on Patentability dated Mar. 8, 2011 for corresponding PCT Application No. PCT/NO2009/000305.
Examination Report dated Apr. 2, 2009 for corresponding NO Application No. 20083783 (English translation provided).
Office Action dated Jul. 9, 2015 for corresponding CA Application No. 2,733,171.

* cited by examiner

METHOD FOR EVAPORATION AND POSSIBLE DISTILLATION OF FLUIDS USING A HEAT PUMP

The invention concerns a method for evaporation of liquids with the assistance of a heat pump, both for the production of evaporated liquids for industrial and other technical purposes, as well as for distillation.

Evaporation of liquids is required in many processes. Both for distribution of energy—where a typical example is the production of steam, or in distillation processes where the most common is the production of ethanol from a fermented sugar and water solution.

Steam from water is used for a variety of purposes due to the thermal properties of water with a relatively high heat capacity in all three phases, as well as a relatively high melting and vaporization heat rate (enthalpy of melting and vaporization). This last property is also one of the problems with the production of steam. A lot of energy is used to evaporate water. Traditionally this has been done by heating water in boilers using traditional energy sources such as oil and gas, coal or electricity. Earlier, as in the first steam locomotives, wood was also used.

By using heat pumps large amounts of energy can be obtained from vast energy reservoirs like rivers, lakes, seawater, the air, the sun or the ground. The problem is to obtain a sufficiently high temperature to make water evaporate. The boiling point of water is 100° C. at 1 atm. or 101.3 kPa.

The invention is to use the low temperature heat produced by the heat pump's condenser to evaporate liquids under low pressure, and thereby at a lower evaporation temperature than at atmospheric pressure. If, for example, the pressure at which water is evaporated is reduced to 10 kPa (appr. 0.1 atm), the evaporating temperature will drop to 45.8° C. Most refrigerants on the market today have a maximum condensation temperature under or just above 100° C. This temperature is too low to evaporate water at atmospheric pressure.

By reducing the evaporation pressure it is possible to use a heat pump to evaporate water under low pressure. To make steam at a higher pressure and temperature requires it to be compressed after evaporation. The advantage with the invention is that energy is supplied from a natural energy reservoir for the most energy intensive part of the steam production—which is the phase transition from liquid to gas.

The same problems as described above will also arise on the evaporation of liquids for distillation. Typical is the production of alcohol in various forms, and also for the production of pure ethanol based on the fermentation of sugar dissolved in water.

The invention can also be used for other distillation processes, or processes for the separation of liquids. Typical for the last mentioned processes is the separation of oil products from tar or oil sand.

FIG. 1) is an embodiment of the invention where the method is exemplified with a process to extract two distilled products from a liquid.

Figure 2:
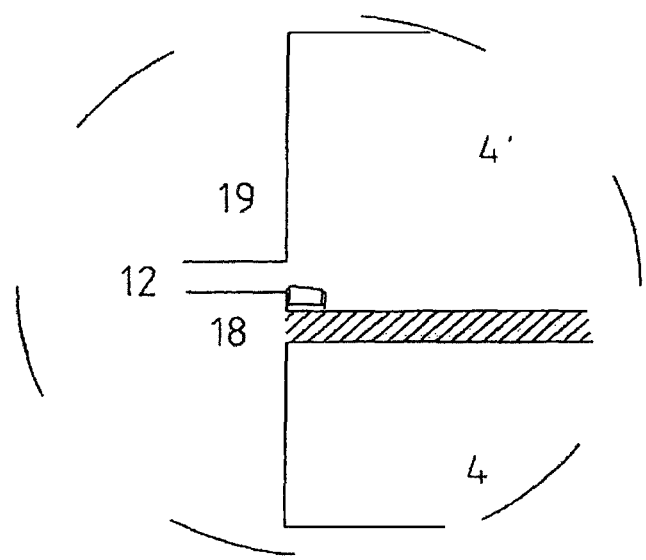

FIG. 2) is a diagram of a possible design of a regulation device (17) for control of the level of the liquids in the evaporator (4').

1) Energy reservoir for the heat pump. This could be rivers, lakes, seawater, the air and the sun, or ground heat. (Illustrated in FIG. 1 as the cross section of a river.)

2) The heat pump's evaporator. This is the heat pumps low pressure side where the refrigerant is heated and evaporated by the heat reservoir.

3) The heat pump's compressor. Here the refrigerant is compressed to a higher pressure and temperature. This is to enable the water or liquid to evaporate in the next stage.

4) The heat pump's condenser. This is the heat pump's high pressure side of a heat exchanger where the refrigerant is cooled off and recondensed by the water or liquids that are to be evaporated.

5 a, b, . . . ) The heat pumps possible extra heat exchangers for extra cooling of the refrigerant. Depending on the operation of the system and the refrigerant's thermal properties, it may be possible to utilize the refrigerant's energy in condensed state on the heat pump's high pressure side to preheat the water or liquids that are to be evaporated. In order to fully utilize this energy, the preheating can be performed in multiple stages. Alternatively the energy can be used for other purposes.

6) The heat pump's pressure reduction valve. This valve reduces the pressure from the heat pump's high pressure side to its low pressure side. This alters the refrigerant's evaporation/saturation-temperature and will cause the refrigerant to evaporate again on the low pressure side.

7) Device for the supply of water or liquids to be evaporated This is the water intake or inlet of liquids to be evaporated, alternatively tank(s) or container(s) with same.

8) Possible supply pump or feeding device for water or liquids. This device may be required if, for various reasons, there are large pressure drops on the supply side, or there is a need to measure the supply of water or liquids.

5'a,b, . . . ) Heat exchangers for preheating of water or liquids to be evaporated. Depending on the operation of the system and the refrigerant's thermal properties, it may be possible to utilize the refrigerant's energy also in the condensed state on the heat pump's high pressure side to preheat the water or liquids that are to be evaporated. In order to fully utilize this energy, the preheating can be performed in multiple stages.

9) Possible pressure reduction valve or device to control the evaporation pressure for the water or liquid that is to be evaporated. To obtain the pressure required to evaporate the water or liquids, a valve or other device may be required on the supply side. Alternatively, a high column (riser) can be used, where the density and gravity of the water or liquids helps reduce the pressure. Or a combination of those two methods can be used.

4') The evaporator. This is the heat exchanger where the water or other liquids are evaporated by the heat from the refrigerant on the heat pump's high pressure side. The water or liquids that are to be evaporated are already preheated to evaporation temperature or higher in (5' a, b, . . . ) or will be in the first part of the heat exchanger. The evaporation takes place under sufficiently low pressure.

10) At least one steam compressor. This is the device that creates the low evaporation pressure in the evaporator (4'), as well as compressing the steam or evaporated liquids to the required pressure for further use. This compressor will act as a first stage in a distillation process.

10') At least one steam compressor for multiple stages in a distillation process. This compressor will compress the evaporated liquids to the next heat exchanger in order to extract the next distilled product. Depending on how many components are to be extracted this stage will be repeated the required number of times in order to separate all the distilled components.

11) At least one intermediate heat exchanger. This is the first of possible multiple stages of heat exchangers to either heat the steam further, or recondense one component after another in a series of distilled, products.

11') At least one intermediate heat exchanger. This is the possible second stage of heat exchangers. Normally this will be one of possible more stages in a distillation process.

11") At least one intermediate heat exchanger. This is possibly the next stage in a multiple distillation process. The remaining evaporated liquids are directed to a new compression stage, or when all distilled products are extracted the remaining residuals are directed to outlet (20). Depending on how many components there are to extract, this stage together with steam compressor for multiple stages (10') will be repeated the required number of times in order to separate all the distilled components.

12) Drainage device for residual non-evaporated products. This is a possible outlet or drainage for those products that are not to be evaporated in a distillation process. If the liquid to be distilled is saltwater this device also must be able to remove salt and other solids.

12') Drainage device for evaporated and then recondensed residuals. This is a possible outlet or drainage for those liquids that are partially evaporated in the evaporator (4') but not wanted as distilled products. Normally this one is not used. Another way is to design the at least one intermediate heat exchanger (11) in such a way that these recondensed residuals will flow back to the evaporator (4') and be drained by the possible drainage device or outlet (12).

12") Drainage device for distilled products. This is where the first distilled product is drawn off.

12'") Drainage device for distilled products. This is where the next distilled product is drawn off. Depending on how many components are to be extracted, this stage together with the at least one steam compressor for multiple stages (10') and the at least one intermediate heat exchanger (11") will be repeated the required number of times in order to separate all the distilled components.

13) Pump for non-evaporated residuals in a distillation process. A pump or other device is required to remove residuals from the process in order to maintain the necessary low evaporation pressure.

13') Pump for evaporated and then recondensed residuals. If the drainage device for evaporated and then recondensed residuals (12') is installed as part of the at least one intermediate heat exchanger (11), a pump or other device will be necessary to remove residuals from the process in order to maintain the necessary low evaporation pressure.

13") Pump for distilled products. A pump is required to draw off the first distilled product from the process in order to maintain the correct pressure throughout the distillation process.

13'") Pump for distilled products. A pump is required to draw off the next distilled product from the process in order to maintain the correct pressure throughout the distillation process. Depending on how many components are to be extracted, this stage together with the at least one steam compressor for multiple stages (10'), the at least one intermediate heat exchanger (11") and drainage device for distilled products (12'") will be repeated the required number of times in order to separate all the distilled components.

14) Valve. This valve is used if the possible pump and/or drainage device (12 and 13) is/are not able to measure out accurately enough the drainage of residuals in order to maintain the correct evaporation pressure in the evaporator (4').

14') Valve. This valve is used if the possible pump and/or drainage device (12' and 13') is/are not able to measure out accurately enough the drainage of residuals in order to maintain the correct evaporation pressure in the evaporator (4').

14") Valve. This valve is used if the possible pump and/or drainage device (12" and 13") is/are not able to measure out accurately enough the distilled products in order to maintain the correct recondensation pressure in the at least one intermediate heat exchanger (11').

14'") Valve. This valve is used if the possible pump and or drainage device (12'" and 13'") are not able to measure out accurately enough the distilled products in order to maintain the correct recondensation pressure in the at least one intermediate heat exchanger (11"). Depending on how many components are to be extracted, this stage together with the at least one steam compressor for multiple stages (10'), the at least one intermediate heat exchanger (11"), drainage device for distilled products (12'") and pump for distilled products (13'") will be repeated the required number of times in order to separate all the distilled components.

15) Drainage device or tank for residuals. If the residuals from a distillation process have to be collected or processed further, it will be necessary to collect them in a tank. Otherwise these are directed to a waste outlet.

15') Container or tank for distilled products. Here the first distilled product is collected.

15") Container or tank for distilled products. Here the next distilled product is collected. Depending on how many components are to be extracted, this stage together with the at least one steam compressor for multiple stages (10'), the at least one intermediate heat exchanger (11"), drainage device for distilled products (12'"), pump for distilled products (13'") and possible valve (14'") will be repeated the required number of times in order to separate all the distilled components.

16) Cooling or heater element for the at least one intermediate heat exchanger. This is a cooling or heater element for a possible at least one intermediate heat exchanger (11). Depending on the use of such a system, this element is either the first stage of the heat pump's condenser (4) in order to utilize the refrigerants temperature after compression. In this case the at least one intermediate heat exchanger (11) will help to increase the steam temperature in order to eliminate saturation of the steam. Alternatively the element can have its own circuit for cooling or heating of the evaporated liquid. The latter will be the case in a distillation process, where the at least one intermediate heat exchanger (11) will be one of more stages in the process. In this configuration the element could be connected with heat exchanger (4), (5a, 5b, ...) to contribute to heating of the liquids in possible pre-heaters (5'a, 5'b, ...) and evaporator (4'), or form a separate circuit with one or more of these. It is also possible to connect the element to external heat exchangers for other use.

16') Cooling or heater element for the at least one intermediate heat exchanger. This is a cooling or heater element for a possible at least one intermediate heat exchanger (11'). Depending on the use of such a system, this element can have its own circuit for cooling or heating of the evaporated liquid, or be connected with cooling or heater element (16) for the at least one intermediate heat exchanger (11). If this element has its own circuit, this one could also be connected as described for the circuit of element (16).

16") Cooling or heater element for the at least one intermediate heat exchanger. This is a cooling or heater element for a possible at least one intermediate heat exchanger (11"). Depending on the use of such a system, this element can have its own circuit for cooling or heating of the evaporated liquid, or be connected with cooling or heater elements (16 and 16') for the at least one intermediate heat exchangers (11 and 11'). The elements (16, 16', 16", ...) can either be connected in series or parallel configuration, or any combination suitable. If this element has its own circuit, this one could also be connected as described for the circuit of element (16). Depending on how many components are to be extracted, this stage will have to be repeated the same number of times as the at least one intermediate heat exchanger (11") in order to extract all the distilled products.

17) Device for regulating level of liquid in evaporator. In order to evaporate all liquid components that are to be separated by distillation it may be necessary to use some form of level regulation in the evaporator. This can be done by installing some form of device on the outlet for residuals (12). It may be a flotation device in a chamber that is designed to regulate the amount of liquid. (See detail as illustrated in FIG. 2.) This device shall not be limited to a float in a chamber, but can be designed in any practical form or shape. As an example in its simplest form this can be done by positioning the outlet or drainage device (12) in a specific position in the evaporator (4').

18) Chamber for a float used for regulating level of liquid. As a possible device to regulate the level of liquid in the evaporator (4'), a chamber can be used with one or more holes to allow liquid to flow freely. The dimensions of the chamber must be designed to fit with the float (19) in such a way that the float can move freely with the variations of the level of liquids in the evaporator (4').

19) Flotation device for regulating level of liquid. As a possible device to regulate the level of liquid in the evaporator (4') a float inside a chamber (18), can be used to regulate the amount drawn off from a possible drainage device for residual non-evaporated products (12). By ensuring the right weight and thereby the density of the float compared to the liquids, it can be ensured that all components to be separated in a distillation process will be evaporated in the evaporator (4').

20) Outlet for steam or evaporated residuals from a distillation process. For steam production this is the stage where the steam has reached its required state for use in industrial or other processes. The steam will be directed to whatever use it is intended for. In a distillation process this is where the evaporated residuals that have no use will be let out or drawn off. For freshwater production from saltwater this stage will not be used.

21) Cooling element to container or supply-pipes for residuals. This is the cooling element for residuals from a distillation process. It is used to extract the heat added to the residuals in the evaporator (4'). This element can either be connected with heat exchangers (4), (5a, 5b, . . . ) to contribute to the heating of the liquids in possible pre-heaters (5'a, 5'b, . . . ) and/or evaporator (4'). It is also possible to connect the element to external heat exchangers for other use.

21') Cooling element to container or supply-pipes for distilled products. This is the cooling element for the first distilled product from a distillation process. It is used to extract the heat left after recondensation in the at least one intermediate heat exchanger (11'). This element can be connected with heat exchangers (4), (5a, 5b, . . . ) to contribute to the heating of the liquids in possible pre-heaters (5'a, 5'b, . . . ) and/or evaporator (4'). Alternatively, the element can be connected to external heat exchangers for other use.

21") Cooling element to container or supply-pipes for distilled products. This is the cooling element for the next distilled product from a distillation process. It is used to extract the heat left after recondensation in the at least one intermediate heat exchanger (11"). This element can be connected with heat exchangers (4), (5a, 5b, . . . ) to contribute to the heating of the liquids in possible pre-heaters (5'a, 5'b, . . . ) and/or evaporator (4'). Alternatively, the element can be connected to external heat exchangers for other use. Depending on how many components are to be extracted, this stage will have to be repeated the same number of times as the container or tank for distilled products (15") in order to extract all the distilled products.

A) Steam production from water. For steam production from water the heat pump will be as described by items (1), (2), (3), (4), (5a), possibly (5b)—to fully utilize the heat energy, and (6). The water intake (7) will normally be from a reservoir or a water pipeline. Depending on the supply of water, a water-pump (8) may or may not be required. To preheat the water a pre-heater (5'a) and possibly (5'b) will be used. Depending on the height from the water-intake (7) or the water-pump (8) to the evaporator (4'), a pressure reduction valve (9) may or may not be required to ensure a low evaporation pressure. The evaporator (4') is where the water is evaporated. At least one intermediate heat exchanger (11) together with a heater element (16) can be used to eliminate saturation of the steam before the at least one steam compressor (10). The steam will then go to outlet (20) for use in other processes.

B) Distillation of ethanol from a fermented sugar solution with water. For distillation of ethanol the heat pump will be as described by items (1), (2), (3), (4), (5a), possibly (5b)—to fully utilize the heat energy, and (6). The intake of liquid (7) will be from a tank with the fermented sugar solution. Depending on the supply, a pump (8) may or may not be required. To preheat the liquid a pre-heater (5'a) and possibly (5'b) will be used. Depending on the height from the intake (7) or the supply pump (8) to the evaporator (4'), a pressure reduction valve (9) may or may not be required to ensure a low evaporation pressure. The evaporator (4') is where the ethanol is evaporated. Normally a device for control of the level of liquid (17) in the evaporator (4') will be used to regulate the drainage of the residual liquids through an outlet or other drainage device (12). The residual liquids are pumped with a pump (13) alternatively through a valve (14) to an outlet or container or tank for the residual liquids (15). The evaporated ethanol is led through at least one intermediate heat exchanger (11) together with a cooling element (16) that is used to recondense whatever water and other heavier distillates than ethanol that have been evaporated together with the ethanol in the evaporator (4'). These recondensed liquids are drained through outlet (12'), with pump (13') alternatively through valve (14') to outlet or container or tank (15). Cooling element (21) can be used to utilize these residual liquids heat to preheat the fermented sugar solution through pre-heater (5a, 5a') and possibly (5b, 5b'). The evaporated ethanol together with other lighter distillates will be compressed with the at least one compressor (10) to another at least one intermediate heat exchanger (11') with a cooling element (16') that is used to recondense the ethanol. The ethanol is drained through outlet (12") and possibly pumped with pump (13") through a possible valve (14") to container or tank (15'). The lighter distillates left will go to outlet (20). In cases where these elements cause pollution problems they can be collected for further processing.

C) Production of freshwater from saltwater. For production of freshwater from saltwater the heat pump will be as described by items (1), (2), (3), (4), (5a) and possibly (5b) to fully utilize the heat energy, and (6). The saltwater intake (7) will normally be from the sea. Depending on the supply, a water-pump (8) may or may not be required. To preheat the saltwater a pre-heater (5'a) and possibly (5'b) will be used. Depending on the height from the water-intake (7) or the water-pump (8) to the evaporator (4') a pressure reduction valve (9) may or may not be required to ensure a low evaporation pressure. The evaporator (4') is where the water is evaporated. Normally a device (17) for control of the liquid level in the evaporator (4') will be used to regulate the drainage of the salt through an outlet or other device (12). The salt will be pumped with a pump (13), alternatively thru a valve (14) to an outlet or container or tank (15). The steam will be compressed with at least one steam compressor (10) to at least one intermediate heat exchanger (11') with a cooling element (16') that is used to recondense the water. The heat collected in cooling element (16') is used to preheat the saltwater in pre-heater (5a-5'a, 5b-5'b, . . . ) and possibly evaporator (4'). The water is drained through outlet (12") and possibly pumped with pump (13") through a possible valve (14") to a tank or freshwater pipeline (15'). Cooling element (21') will be used in parallel with cooling element (16') to utilize the heat of the recondensed water to preheat and maybe partly evaporate the saltwater.

The method for evaporating and possibly distilling liquids with the assistance of a heat pump can be utilized by most processes where the evaporation of liquids and their usage integrated. Other examples are the paper and pulp industry, the production of gypsum boards and the extraction of oil products from tar or oil sand, as well as many other industries.

The invention claimed is:

1. A method for at least one of evaporation and distillation of liquids using a heat pump, the method comprising:
   a) providing the heat pump and a liquids evaporator, the heat pump including a refrigerant evaporator, a refrigerant compressor, and a refrigerant condenser;
   b) reducing pressure in the liquids evaporator to a liquids evaporation pressure that: is lower than atmospheric pressure by, at least in part, reducing an inlet pressure at a liquids inlet of the liquids evaporator;
   c) using heat of the refrigerant condenser to evaporate the liquids in the liquids evaporator at the liquids evaporation pressure, where the liquids have a reduced evaporation temperature and an output of the liquids evaporator includes evaporated liquids, wherein the refrigerant condenser and the liquids evaporator comprise a heat exchanger and wherein the evaporated liquids are subsequently introduced to at least one steam compressor; and
   d) eliminating saturation of the evaporated liquids before the evaporated liquids are subsequently introduced to the at least one steam compressor by further heating of the evaporated liquids leaving the liquids evaporator in at least one intermediate heat exchanger, each of the at least one intermediate heat exchanger comprising a heater element having an inlet and an outlet, the heater element inlet in fluid communication with the refrigerant compressor and the heater element outlet in fluid communication with an, inlet of the refrigerant condenser,
   wherein the further heating of the evaporated liquids leaving the liquids evaporator utilizes a peak temperature of refrigerant leaving the heat pump refrigerant compressor.

2. The method as defined in claim 1 wherein reducing the pressure in the liquids evaporator to the liquids evaporation pressure by reducing the inlet pressure comprises
   using a pressure reduction valve fitted on the liquids inlet of the liquids evaporator.

3. The method as defined in claim 1 wherein reducing the pressure in the liquids evaporator to the liquids evaporation pressure by reducing the inlet pressure comprises
   using the natural resistance at the liquids inlet of the: liquids evaporator together with a pump or the at least one steam compressor for suction of the evaporated liquids from the evaporator.

4. The method as defined in claim 1, wherein each of the at least one steam compressor has a low pressure inlet and a high pressure outlet, wherein the low pressure inlet of the at least one steam compressor downstream of the at least one intermediate heat exchanger and the liquids evaporator is in fluid communication with the liquids evaporator and is arranged to create and maintain, in combination with reducing the inlet pressure at the liquids inlet of the liquids evaporator, the lower than atmospheric pressure in the liquids evaporator, and wherein the at least one steam compressor increases the pressure and temperature of the evaporated liquids at the outlet of said at least one steam compressor.

5. The method as defined in claim 4, wherein at least one pressure reduction device is arranged at the liquids inlet of the liquids evaporator to obtain the lower than atmospheric pressure in the liquids evaporator, wherein the at least one pressure reduction device includes a heat exchanger with at least one column and/or pipe riser that reduces the pressure of the flowing liquids by gravitation.

6. The method as defined in claim 1, wherein at least one extra heat exchanger is arranged to use heat produced by the heat pump to preheat the liquids before passing the liquids to the liquids evaporator where the liquids are evaporated.

7. The method as defined in claim 1, wherein at least one additional-stage intermediate heat exchanger is arranged to condensate distilled products and residuals out of the evaporated liquids, wherein the at least one additional-stage intermediate heat exchanger comprises at least one cooling element.

8. The method as defined in claim 7, wherein the at least one cooling element of the at least one additional-stage intermediate heat exchanger is connected in series and/or in parallel, wherein, energy collected from the at least one additional-stage intermediate heat exchanger is used to preheat the liquids in at least one extra heat exchanger, and/or to heat and evaporate liquids in the liquids evaporator.

9. The method as defined in claim 1, wherein at least one additional-stage intermediate heat exchanger is arranged to post-heat the evaporated liquids in order to obtain a temperature greater than a temperature of the evaporated liquids at the outlet of the at least one steam compressor.

10. The method as defined in claim 1, wherein the heater element of the at least one intermediate heat exchanger is arranged as a first section of the refrigerant condenser.

* * * * *